United States Patent
Redaelli et al.

(10) Patent No.: US 12,165,491 B2
(45) Date of Patent: Dec. 10, 2024

(54) METHOD, APPARATUS, AND SYSTEM FOR A FASTENER HAVING A WIRELESS MONITORING SYSTEM

(71) Applicant: Fontana Fasteners R.D. S.R.L., Veduggio con Colzano (IT)

(72) Inventors: Paolo Redaelli, Monastero (IT); Simone Aiassa, Osasio (IT); Flora Barlassina, Seregno (IT); Sergio Cattaneo, Colzano (IT); Alberto Fontana, Colzano (IT); Giuseppe Fontana, Colzano (IT)

(73) Assignee: FONTANA FASTENERS R.D. S.R.L., Veduggio con Colzano (IT)

(*) Notice: Subject to any disclaimer, the term of this patent is extended or adjusted under 35 U.S.C. 154(b) by 253 days.

(21) Appl. No.: 17/954,726

(22) Filed: Sep. 28, 2022

(65) Prior Publication Data
US 2023/0094239 A1    Mar. 30, 2023

Related U.S. Application Data

(60) Provisional application No. 63/249,537, filed on Sep. 28, 2021.

(51) Int. Cl.
*G08B 21/18* (2006.01)
*G08C 17/02* (2006.01)

(52) U.S. Cl.
CPC ........... *G08B 21/187* (2013.01); *G08C 17/02* (2013.01)

(58) Field of Classification Search
CPC .. G08B 21/187; F16B 31/02; F16B 2031/022; G01L 1/255; G01L 5/24; G08C 17/02
See application file for complete search history.

(56) References Cited

U.S. PATENT DOCUMENTS

| | | |
|---|---|---|
| 4,294,122 A | 10/1981 | Couchman |
| 5,970,798 A | 10/1999 | Gleman et al. |
| (Continued) | | |

FOREIGN PATENT DOCUMENTS

| | | |
|---|---|---|
| DE | 202007007219 U1 | 7/2007 |
| EP | 2803871 A1 | 11/2014 |
| (Continued) | | |

*Primary Examiner* — Daniel L Murphy
*Assistant Examiner* — Amie M Ndure
(74) *Attorney, Agent, or Firm* — Quinn IP Law

(57) ABSTRACT

A fastener and a system, apparatus, and method for monitoring a fastener are described. The fastener includes a head portion, a shank portion, a transponder, and a compression spring, wherein the head portion includes a mounting portion, and wherein the transponder is disposed in the mounting portion of the head portion. The transponder is arranged to monitor the shank portion, and includes an ultrasonic sensor and a signal processing circuit. The ultrasonic sensor is affixed to a transducer hosting surface, and is urged against the transducer hosting surface by placement of the printed circuit board in the head portion with the compression spring intervening therebetween. The ultrasonic sensor communicates with the signal processing circuit via the compression spring. The signal processing circuit captures a signal from the ultrasonic sensor and transforms the signal into a parameter corresponding to a tensile force being exerted by the fastener.

20 Claims, 5 Drawing Sheets

(56) References Cited

U.S. PATENT DOCUMENTS

| | | | |
|---|---|---|---|
| 7,012,511 B2 | 3/2006 | Hayes | |
| 7,412,898 B1 | 8/2008 | Smith et al. | |
| 7,467,556 B2* | 12/2008 | Kibblewhite | F16B 25/10 |
| | | | 73/761 |
| 7,603,894 B2 | 10/2009 | Breed | |
| 7,766,547 B2* | 8/2010 | Weppenaar | G01L 9/0072 |
| | | | 73/866.5 |
| 8,033,181 B2* | 10/2011 | Kibblewhite | B25B 23/147 |
| | | | 73/761 |
| 8,540,468 B2 | 9/2013 | Mekid et al. | |
| 8,596,134 B2 | 12/2013 | Mekid et al. | |
| 8,683,869 B2* | 4/2014 | Herley | F16B 31/02 |
| | | | 73/761 |
| 8,810,370 B2* | 8/2014 | Tillotson | H04Q 9/14 |
| | | | 73/761 |
| 9,339,926 B2* | 5/2016 | Kibblewhite | B25F 5/00 |
| 9,483,674 B1 | 11/2016 | Fink et al. | |
| 9,915,574 B2* | 3/2018 | George | G01L 5/0019 |
| 9,964,134 B1 | 5/2018 | Tran et al. | |
| 10,088,378 B2* | 10/2018 | Kibblewhite | G01L 5/246 |
| 10,147,246 B2 | 12/2018 | Krapf et al. | |
| 10,877,003 B2* | 12/2020 | Kessler | G01N 29/04 |
| 10,948,358 B2 | 3/2021 | Lanzani et al. | |
| 2005/0083186 A1 | 4/2005 | Hayes | |
| 2011/0158806 A1 | 6/2011 | Arms et al. | |
| 2014/0245821 A1* | 9/2014 | Miller | G01M 15/04 |
| | | | 73/114.01 |
| 2015/0247520 A1* | 9/2015 | Hsieh | G01L 5/24 |
| | | | 411/14 |
| 2018/0073542 A1* | 3/2018 | Saigo | H02J 50/12 |

FOREIGN PATENT DOCUMENTS

| | | | | |
|---|---|---|---|---|
| GB | 2469019 A | 10/2010 | | |
| WO | WO-2014180731 A1 * | 11/2014 | | B25B 23/14 |
| WO | 2017108051 A1 | 6/2017 | | |
| WO | 2021014381 A1 | 1/2021 | | |
| WO | 2021090265 A1 | 5/2021 | | |

* cited by examiner

METHOD, APPARATUS, AND SYSTEM FOR A FASTENER HAVING A WIRELESS MONITORING SYSTEM

CROSS-REFERENCE TO RELATED APPLICATIONS

This application claims the benefit of U.S. Provisional Patent Application No. 63/249,537 filed on Sep. 28, 2021, the disclosure of which is hereby incorporated by reference.

INTRODUCTION

Fasteners such as threaded screws and rivets may be employed to mechanically couple components at junctions. A fastener exerts a compressive or clamping load on the joined components using complementary matched threads in the case of a screw, or a deformed end in the case of a rivet, with a corresponding tensile load being exerted upon the fastener.

The fasteners and joined components may be subjected to dynamic mechanical stress, thermal stress, etc., which can affect the magnitude of the compressive load that is exerted by the fastener on the joined components in-use. A change in the magnitude of the compressive load that is exerted by the fastener on the joined components may affect the service life of the joined components.

A fastener may be remotely located, or otherwise positioned in a manner that renders periodic testing difficult to manage or achieve.

There is a need for a fastener that includes a monitoring system to determine and wirelessly communicate a magnitude of compressive or clamping load that being exerted on components that are joined by the fastener. There is also a need to have a fastener having an embedded wireless monitoring system that is readily fabricated.

SUMMARY

A fastener and a system, apparatus, and method for monitoring a fastener are described. The fastener includes a head portion, a shank portion, a transponder, and a compression spring, wherein the head portion includes a mounting portion, and wherein the transponder is disposed in the mounting portion of the head portion. The transponder is arranged to monitor the shank portion, and includes an ultrasonic sensor and a signal processing circuit. The signal processing circuit is arranged on a printed circuit board. The ultrasonic sensor is affixed to a transducer hosting surface arranged on a first end of the shank portion, and is urged against the transducer hosting surface by placement of the printed circuit board in the head portion with the compression spring intervening therebetween. The ultrasonic sensor communicates with the signal processing circuit via the compression spring. The signal processing circuit activates the ultrasonic sensor. The signal processing circuit captures a signal from the ultrasonic sensor and transforms the signal into a parameter corresponding to a tensile force being exerted by the fastener.

An aspect of the disclosure may include the printed circuit board including a grounding ring arranged on an outer periphery thereof, wherein the grounding ring is in electrical contact with the head portion of the fastener.

Another aspect of the disclosure may include a wireless communication circuit, and an electric power circuit, wherein the signal processing circuit, the wireless communication circuit, and the electric power circuit are arranged on a printed circuit board, and wherein the electric power circuit supplies electric power to the signal processing circuit and the wireless communication circuit.

Another aspect of the disclosure may include the electric power circuit supplying electric power to the signal processing circuit and the wireless communication circuit.

Another aspect of the disclosure may include the electric power circuit being arranged to supply the electric power to the signal processing circuit and the wireless communication circuit in response to an input signal.

Another aspect of the disclosure may include the grounding ring being arranged to electrically ground the printed circuit board to the head portion of the fastener.

Another aspect of the disclosure may include the wireless communication circuit generating a message based upon the parameter corresponding to the tensile force.

Another aspect of the disclosure may include the parameter corresponding to the tensile force being exerted by the fastener being a longitudinal length of the shank portion.

Another aspect of the disclosure may include the compression spring being an elliptic leaf spring that is interposed between the signal processing circuit and the ultrasonic sensor.

Another aspect of the disclosure may include the compression spring being an S-shaped spring that is interposed between the signal processing circuit and the ultrasonic sensor.

Another aspect of the disclosure may include the compression spring being a tilting spring that is interposed between the signal processing circuit and the ultrasonic sensor.

Another aspect of the disclosure may include the compression spring being a first end portion joined to a second end portion via an elastic portion, wherein the first end portion is in contact with the ultrasonic sensor and wherein the second end portion is in contact with the signal processing circuit.

Another aspect of the disclosure may include a system for monitoring first and second components at a junction that includes a fastener having a shank portion; a transponder; a compression spring; a grounding ring; and a remotely-disposed interrogator. The transponder is arranged to monitor the shank portion, and the transponder includes an ultrasonic sensor, a signal processing circuit, a wireless communication circuit, and an electric power circuit. The signal processing circuit, the wireless communication circuit, and the electric power circuit are arranged on a printed circuit board. The ultrasonic sensor is arranged on a first end of the shank portion, and is in communication with the signal processing circuit via the compression spring. The signal processing circuit captures a signal from the ultrasonic sensor and transforms the signal into a parameter corresponding to tensile force being exerted by the fastener at the junction of the first and second components. The wireless communication circuit generates a message based upon the parameter associated with the tensile force being exerted by the fastener at the junction of the first and second components, and the remotely-disposed interrogator is arranged to wirelessly communicate with the wireless communication circuit of the fastener to receive the message based upon the parameter associated with the tensile force being exerted by the fastener at the junction of the first and second components.

Another aspect of the disclosure may include the fastener further including a head portion; wherein the head portion includes a mounting portion; and wherein the transponder is disposed in the mounting portion of the head portion.

Another aspect of the disclosure may include the ultrasonic sensor being urged against the first end of the shank portion by placement of the printed circuit board in the head portion with the compression spring intervening therebetween.

Another aspect of the disclosure may include the grounding ring being arranged to electrically ground the printed circuit board to the head portion.

Another aspect of the disclosure may include the electric power circuit being arranged to generate electric power in response to an input signal.

Another aspect of the disclosure may include the signal processing circuit being arranged to activate the ultrasonic sensor and activate the electric power circuit in response to an input signal.

Another aspect of the disclosure may include the remotely-disposed interrogator being arranged to generate the input signal.

Another aspect of the disclosure may include a method for fabricating a fastener having a wireless transponder by forming a fastener body including a head portion and a shank portion, wherein the head portion includes a void space that is countersunk into the head portion, assembling an ultrasonic sensor onto a first end of the shank portion, fabricating a printed circuit board having a signal processing circuit, a wireless communication circuit, an electric power circuit and a grounding ring assembled thereon, assembling a conductive compression spring onto the signal processing circuit, assembling the printed circuit board onto the head portion, including the conductive compression spring being in contact with the ultrasonic sensor, and the grounding ring of the printed circuit board being in electrical contact with the head portion, and applying a curable bonding material onto an outer periphery of the printed circuit board and the head portion. The signal processing circuit, wireless communication circuit, electric power circuit and grounding ring are disposed in the void space of the head portion, and the ultrasonic sensor communicates with the signal processing circuit via the conductive compression spring.

Another aspect of the disclosure may include a system for monitoring a fastener that is arranged to secure first and second components at a junction. The system includes a fastener and a remotely-disposed interrogator. The fastener has a head portion and a shank portion; a transponder including an ultrasonic sensor, a signal processing circuit, and a wireless communication circuit; a compression spring; and a grounding ring. The ultrasonic sensor generates a signal corresponding to tensile force being exerted by the fastener. In one embodiment, the signal processing circuit transforms the signal into a parameter that corresponds to a tensile force being exerted by the fastener at the junction of the first and second components.

Another aspect of the disclosure may include the remotely-disposed interrogator being arranged to wirelessly communicate with the wireless communication circuit of the transponder to receive a message based upon the parameter corresponding the tensile force being exerted by the fastener at the junction of the first and second components. Upon receipt of a message, the remotely-disposed interrogator may signal occurrence of relaxation or fault to an operator or a remotely-located control room. The operator may decide upon an action based upon a risk analysis.

Another aspect of the disclosure may include a temperature sensor being arranged to monitor the temperature of the bolt. The temperature is used to compensate the ultrasonic measure.

The above summary is not intended to represent every possible embodiment or every aspect of the present disclosure. Rather, the foregoing summary is intended to exemplify some of the novel aspects and features disclosed herein. The above features and advantages, and other features and advantages of the present disclosure, will be readily apparent from the following detailed description of representative embodiments and modes for carrying out the present disclosure when taken in connection with the accompanying drawings and the claims.

BRIEF DESCRIPTION OF THE DRAWINGS

One or more embodiments will now be described, by way of example, with reference to the accompanying drawings, in which.

Figure 1:
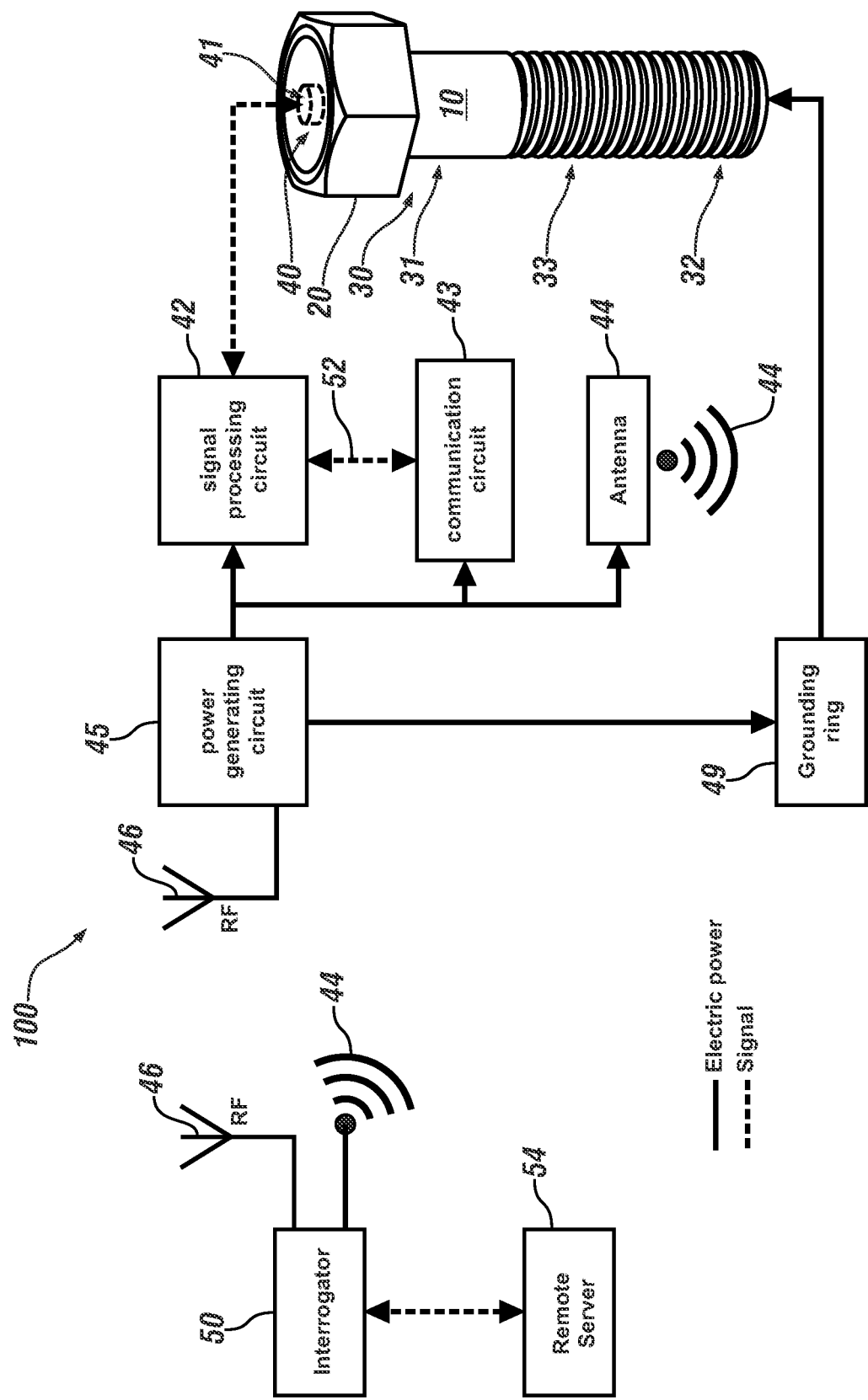
FIG. 1 schematically illustrates a system, method, and apparatus that includes a fastener, a transponder, and an interrogator, in accordance with the disclosure.

The appended drawings may present a somewhat simplified representation of various features of the present disclosure as disclosed herein, including, for example, specific dimensions, orientations, locations, and shapes. Details associated with such features will be determined in part by the particular intended application and use environment.

DETAILED DESCRIPTION

The components of the disclosed embodiments, as described and illustrated herein, may be arranged and designed in a variety of different configurations. Thus, the following detailed description is not intended to limit the scope of the disclosure, as claimed, but is merely representative of possible embodiments thereof. In addition, while numerous specific details are set forth in the following description in order to provide a thorough understanding of the embodiments disclosed herein, some embodiments can be practiced without some of these details. Moreover, for the purpose of clarity, certain technical material that is understood in the related art has not been described in detail in order to avoid unnecessarily obscuring the disclosure.

The drawings are in simplified form and are not to precise scale. For purposes of convenience and clarity only, directional terms such as upper, lower, top, bottom, left, right, up, over, above, below, beneath, rear, and front, may be used with respect to the drawings. These and similar directional terms are not to be construed to limit the scope of the disclosure. Furthermore, the disclosure, as illustrated and described herein, may be practiced in the absence of an element that is not specifically disclosed herein.

The detailed description is merely exemplary in nature and is not intended to limit the application and uses. There is no intention to be bound by any expressed or implied theory presented herein. The use of ordinals such as first, second and third does not necessarily imply a ranked sense of order, but rather may only distinguish between multiple instances of an act or structure.

Referring to the drawings, which are provided for the purpose of illustrating certain exemplary embodiments and not for the purpose of limiting the same, FIGS. 1, 2, 3A and 3B illustrate elements related to a system, method, and apparatus 100 that include a fastener 10 having an embedded transponder 40, wherein the fastener 10 is arranged to mechanically couple first and second components 11, 12, respectively, at a junction 14. The system, method, and apparatus 100 may also include a wireless interrogator 50, and in one embodiment, a remote server 54. A non-limiting example of the first and second components 11, 12 joined at the junction 14 include, e.g., a cylinder head portion being joined to an engine block of an internal combustion engine, a structural joint in a bridge, tower, or the like, train rails, or other, without limitation. Like reference numerals represent to like or similar components throughout the several Figures.

The fastener 10 is an elongated metallic device that includes, in one embodiment, a head portion 20 and the shank portion 30, with the transponder 40 arranged on and assembled to the head portion 20. In one embodiment, the fastener 10 is a threaded bolt that is cold-forged from metallic material. The fastener 10 may be fabricated from one or more of the following materials: titanium, titanium alloys; nickel-chrome alloys, stainless steel, mild steel, cast iron, aluminum, aluminum alloys, etc., without limitation.

The transponder 40 is capable of measuring a physical parameter 52 of the fastener 10. In one embodiment, the physical parameter 52 is a longitudinal length 35 of the fastener 10. In one embodiment, the longitudinal length 35 of the fastener 10 corresponds to a tensile force that is exerted by the fastener 10 on the first and second components 11, 12 at the junction 14 when the fastener 10 is employed to mechanically clamp the first and second components 11, 12 at the junction 14.

The head portion 20 includes a mounting portion 21, which may include a void space 22 that is countersunk into the head portion 20. In one embodiment, the void space 22 formed in the head portion 20 is a cylindrically-shaped void that is coaxial with the longitudinal axis 34 that is defined by the shank portion 30. Alternatively, the void space 22 formed in the head portion 20 is a cube-shaped void, i.e., has a rectangular prismatic shape, with a centroid that is coaxial with the longitudinal axis 34 that is defined by the shank portion 30.

The head portion 20 includes a flanged portion 26 that projects radially outwardly and upwardly from the shank portion 30. The flanged portion 26 may have a hexagonal shape orthogonal to the longitudinal axis 34, or, alternatively, a square shape, a round shape, or another shape depending upon the needs of the specific application. In use, the flanged portion 26 may rest on an upper portion of the first component 11 to urge the first component 11 towards the second component 12.

The shank portion 30 is an elongated portion of the fastener 10 having a smaller diameter than the flanged portion 26 of the head portion 20, and defines a longitudinal axis 34. The shank portion 30 has a securing portion 33 for mechanically coupling to the second component 12. The securing portion 33 of the shank portion 30 is configured to connect to the second component 12 via one of a threaded portion that is formed in the second component 12, a threaded nut (not shown) that is placed on a side of the second component 12 that is opposite to the junction 14, or a second head portion (not shown) that is formed on the shank portion 30 by deforming an end portion of the shank portion 30 on a side of the second component 12 that is opposite to the junction 14.

In one embodiment and as illustrated, the securing portion 33 of shank portion 30 is threaded, with the second component 12 having a threaded aperture 13 that joins with the threads of the shank portion 30 of the fastener 10 to mechanically couple the first and second components 11, 12. This is illustrated with reference to FIG. 2. Alternatively, the securing portion 33 is threaded, with the aperture 13 of the second component 12 being unthreaded. A nut (not shown) joins with the threads of the shank portion 30 of the fastener 10 to mechanically couple the first and second components 11, 12. Alternatively, the fastener 10 includes an unthreaded shank portion 30, with the aperture 13 of the second component 12 being unthreaded. A second, distal end 32 of the shank portion 30 is deformed to mechanically couple the first and second components 11, 12.

The system 100 is composed of the fastener 10 and the interrogator 50 that are arranged to monitor and determine the physical parameter 52 of the fastener 10 corresponding to tensile force being exerted by the fastener 10 on a junction. In one embodiment, the physical parameter 52 of the fastener 10 is longitudinal length of the shank portion 30 of the fastener 10, from which a bolt tension and/or bolt torque may be determined.

Figure 2:
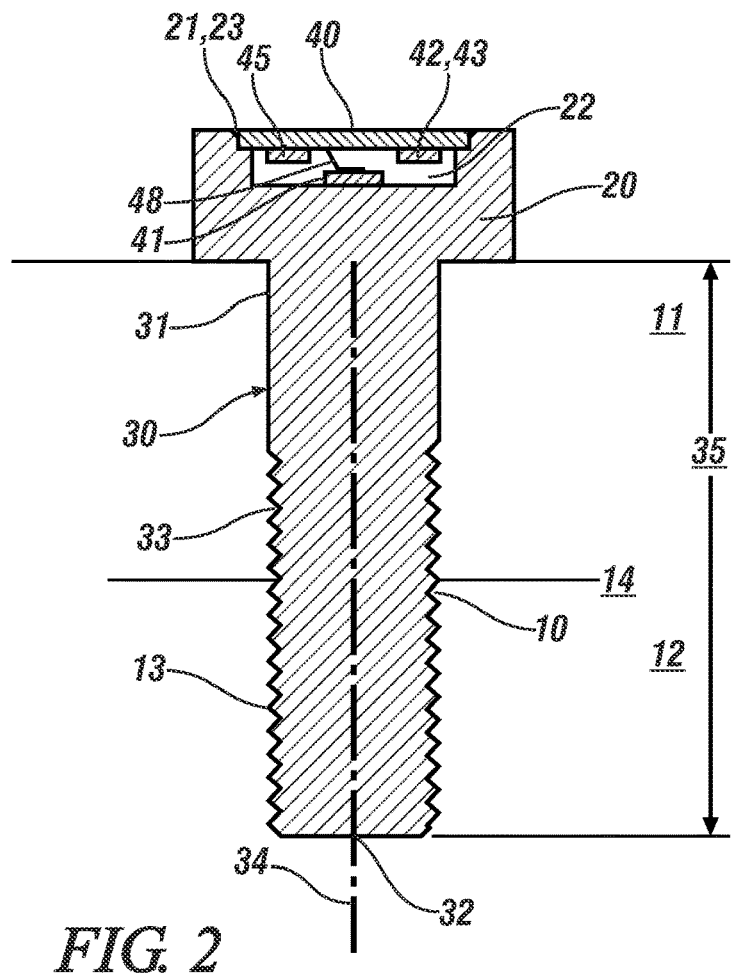
FIG. 2 schematically illustrates a cutaway side view of a fastener and a transponder, in accordance with the disclosure.
Figure 3A:
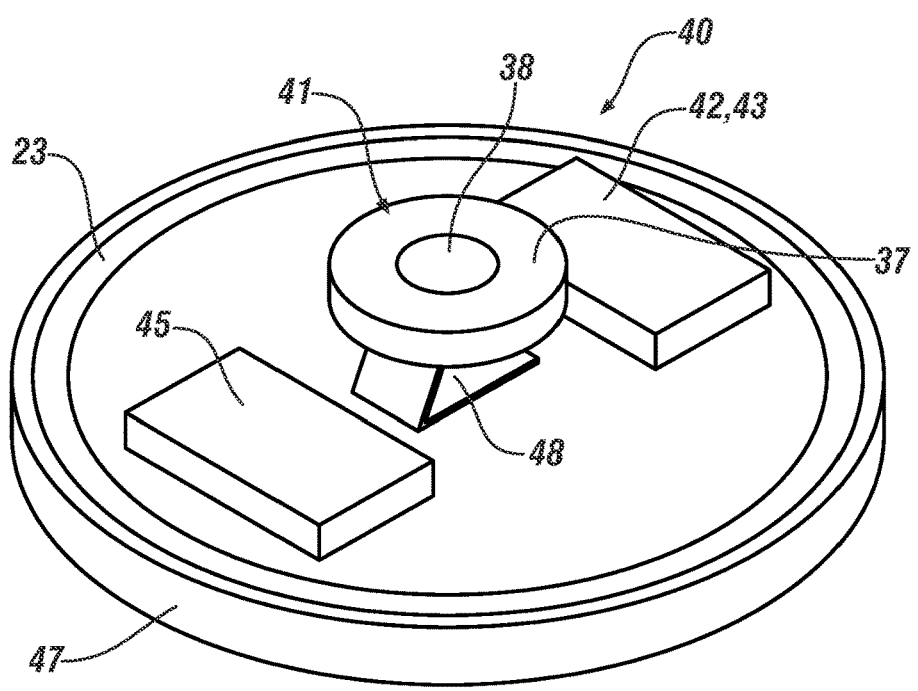
FIG. 3A schematically illustrates an isometric view of a transponder, in accordance with the disclosure.
Figure 3B:
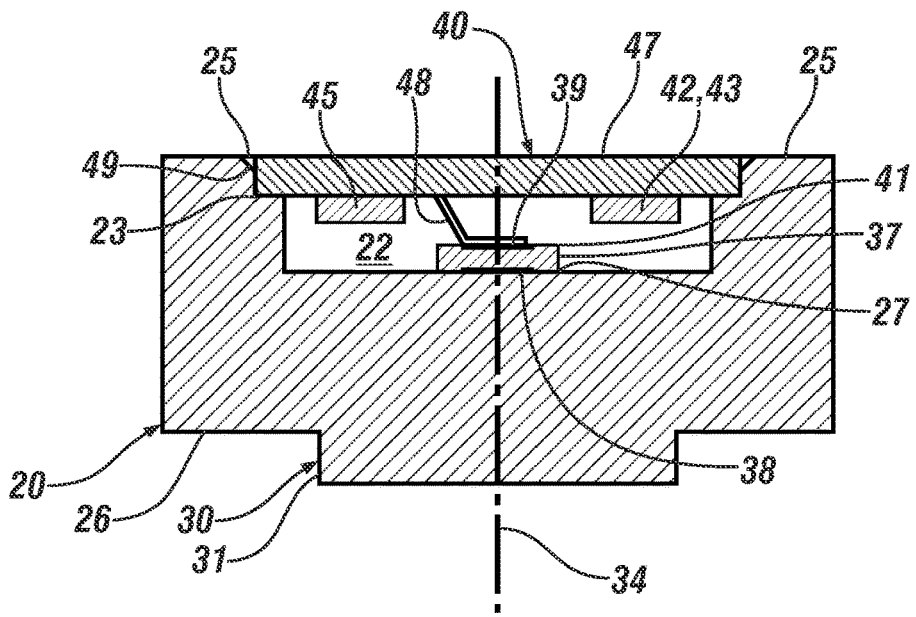
FIG. 3B schematically illustrates a cutaway side view of a head portion of a fastener including a transponder, in accordance with the disclosure.

As shown with reference to FIG. 2, the system 100 is arranged to remotely and wirelessly monitor a compressive clamping force that is being exerted by the fastener 10 upon the first and second components 11, 12, respectively, at the junction 14 based upon the physical parameter 52 of the fastener 10 that corresponds to the longitudinal length of the fastener 10.

The void space 22 that is formed in the head portion 20 of the fastener 10 provides a free, open space for housing electronic elements on a printed circuit board (PCB) 47 of the transponder 40. The PCB 47 includes a printed circuit design that includes electrically conductive leads, etchings, vias, insulating layers, etc., which serve to interconnect terminals of the signal processing circuit 42, the wireless communication circuit 43, and an electric power circuit 45 to effect operation of the transponder 40. The PCB 47 also includes an electrical grounding ring 49 that circumscribes an outer periphery of the PCB 47.

The head portion 20 of fastener 10 includes a mounting portion 21 having an annular shoulder 23 that corresponds to the outer periphery of the PCB 47, thus providing a grounding path for the PCB 47 to the fastener 10. The mounting portion 21 of the head portion 20 serves to provide a placement location for the PCB 47. When the PCB 47 is installed on the head portion 20, the electrical grounding ring 49 physically and electrically contacts the annular shoulder 23. A curable bonding material 25 is applied onto an outer periphery of the PCB 47 and the mounting portion 21 the head portion 20, thus securing the electronic portions of the PCB 47 to the head portion 20 and hermetically sealing the electronic portions of the PCB 47 into the head portion 20.

The PCB 47 has a geometric shape that corresponds to a cross-sectional shape of the void space 22 that is formed in the head portion 20. In one embodiment, and as illustrated, the PCB 47 has a circular cross-sectional shape. Alternatively, the PCB 47 may have a square cross-sectional shape.

A first, proximal end 31 of the shank portion 30 is defined by the void space 22. The proximal end 31 of the shank portion 30 in the void space 22 has an ultrasound sensor hosting surface 27 that is arranged to accommodate the transponder 40, including providing an electrical ground for elements of the transponder 40. The ultrasound sensor hosting surface 27 is coaxial with the longitudinal axis 34. The ultrasound sensor hosting surface 27 is disposed on the first, proximal end 31 of the shank portion 30, and includes a region of the first end 31 of the shank portion 30 with a surface that facilitates a maximum amount of direct physical contact between the shank portion 30 and a piezoelectric crystal device of an ultrasonic sensor 41. This may be achieved by cold forging of the surface with a specific surface design, or the surface may be machined, ground, polished, or otherwise treated to remove surface unevenness, thus facilitating a maximum amount of direct physical contact between the shank portion 30 and the piezoelectric crystal device of the ultrasonic sensor 41.

The transponder 40 includes the ultrasonic sensor 41, a signal processing circuit 42, a wireless communication circuit 43, a compression spring 48, and the electric power circuit 45. The transponder 40 is arranged to monitor the shank portion 30 of the fastener 10, and more specifically, may be arranged to monitor the shank portion 30 of the fastener 10 to determine a signal corresponding to the longitudinal length 35 of the shank portion 30. The longitudinal length 35 of the shank portion 30 may be correlated to tensile force being exerted by the fastener 10. The transponder 40 transforms, in one embodiment, the signal corresponding to the longitudinal length 35 of the shank portion 30 into a parameter corresponding to the tensile force being exerted by the fastener 10 at the junction 14 of the first and second components 11, 12.

The ultrasonic sensor 41 includes a piezoelectric crystal device 37 in one embodiment. The piezoelectric crystal device 37 has a first electrode 38 on a first, lower surface, and a second electrode 39 on a second, lower surface. The first and second electrodes 38, 39 may be composed of silver, a silver alloy, copper, a copper alloy, or another electrically conductive material. In one embodiment, the first electrode 38 is composed of silver or a silver alloy material, which may facilitate adhesion onto the ultrasound sensor hosting surface 27. In one embodiment, the second electrode 39 is composed of copper or a copper alloy material, which may facilitate soldering on the compression spring 48. The first electrode 38 is secured to the ultrasound sensor hosting surface 27 that is arranged on the first, proximal end 31 of the shank portion 30 via an adhesive material or an adhesive or soldering process. The second electrode 39 is secured to the compression spring 48 via an adhesive material or an adhesive or soldering process.

Alternatively, the piezoelectric crystal device 37 of the ultrasonic sensor 41 may be deposited onto the ultrasound sensor hosting surface 27 employing thin film technology.

The piezoelectric crystal device converts a first electrical input signal generated by the signal processing circuit 42 to an ultrasonic signal that is propagated through the shank portion 30. A return signal is captured by the piezoelectric crystal device and converted to a second electrical signal, which is communicated to the signal processing circuit 42. The signal processing circuit 42 converts the second electrical signal to a signal that may be correlated to longitudinal length 35 of the shank portion 30 along its longitudinal axis 34. Alternative embodiments may employ other sensing technologies in place of or in combination with the ultrasonic sensor 41, including, by way of non-limiting examples, a strain gage sensor, a heat flow sensor capable of measuring a thermal gradient, an accelerometer, a vibration sensor, etc.

The ultrasonic sensor 41 is electrically coupled to and in communication with the signal processing circuit 42 via the compression spring 48, which is fabricated from electrically conductive material. Stated differently, the compression spring 48 is the electrical connection that enables the signal processing circuit 42 to electrically power and communicate with the ultrasonic sensor 41.

The compression spring 48 may be a finger spring, or alternatively, a spring pin, or alternatively, another spring-loaded device that is fabricated from electrically conductive material. The compression spring 48 is described in detail herein.

The compression spring 48 urges the ultrasonic sensor 41 against the first end 31 of the shank portion 30 by placement of the PCB 47 in the void space 22 of the head portion 20, with the compression spring 48 placed therebetween. The flexibility provided by the compression spring 48 facilitates assembly of the piezoelectric crystal device of the ultrasonic sensor 41 onto the ultrasound sensor hosting surface 27 on the first, proximal end 31 of the shank portion 30 during a first step during fabrication, and a subsequent assembly of the PCB 47 including the signal processing circuit 42, wireless communication circuit 43, and electric power circuit 45 into the head portion of the fastener 10 at a later, subsequent step of the fabrication process.

The signal processing circuit 42 includes, in one embodiment, an electronic circuit that is controllable to electrically drive the ultrasonic sensor 41 to send a measurement signal, and monitor, filter, and process a return signal that may be captured from the ultrasonic sensor 41. In one embodiment, the signal processing circuit 42 includes a temperature sensor that is arranged to monitor temperature of the bolt, which is employed to provide temperature compensation for the ultrasonic signal that is propagated through the shank portion 30 and the return signal that is captured by the piezoelectric crystal device. In one embodiment, the signal processing circuit 42 includes software and control circuitry to convert the return signal captured from the ultrasonic sensor 41 to the physical parameter 52, such as a measurement of the length of the shank portion 30. In one embodiment, the signal processing circuit 42 executes a time-of-flight (ToF) analysis to convert the return signal captured from the ultrasonic sensor 41 to physical parameter 52, wherein the physical parameter 52 may be a length measurement, or alternatively, the physical parameter 52 may be a transmission measurement. A ToF analysis includes generating an ultrasonic pulse, and monitoring an elapsed time for the ultrasonic pulse to reflect off an object and echo back to the ultrasonic sensor 41. Alternatively, other sensing methods may be employed to determine a physical parameter that is related to tension in the fastener 10.

The wireless communication circuit 43 is a device for short-range, wireless communication, and includes, in one embodiment, a WiFi network technology that enables wireless connectivity. The term "WiFi" is employed herein to indicate a wireless network protocol for local area networking of devices, and is based upon IEEE 802.11 protocol standards for connectivity. The wireless communication circuit 43 may be implemented according to one or a combination of the standards IEEE 802.11 (WiFi), IEEE 802.14.5 (ZigBee for example), Bluetooth®, NFC (Near Field Communication) or another short-range RF communication protocol, RFID (Radio Frequency Identification), etc. The wireless communication circuit 43 communicates with the interrogator 50 via antenna 44.

The interrogator 50 may be a hand-held device in one embodiment that includes either or both wireless antenna 44 and RF antenna 46. Alternatively, the interrogator 50 may be a local device that is permanently affixed to a structure. In one embodiment, the interrogator 50 includes a long-range cellular communications interface that is arranged to communicate with a remote server 54 employing one or a combination of communication standards, such as Universal Mobile Telecommunications System (UMTS), 3GPP Long Term Evolution (LTE), High Speed Packet Access, HSPA, or Global System for Mobile communication (GSM), etc. The remote server 54 may be a cloud-based system, or another back-office system that is capable of gathering, compiling and analyzing information from the interrogator 50.

The electric power circuit 45 is arranged to supply electrical power to the signal processing circuit 42 and the wireless communication circuit 43 to effect operation thereof.

The electric power circuit 45 may include a radio-frequency (RF) antenna 46 that is arranged to wirelessly capture an RF excitation signal from the interrogator 50 or another remotely located interrogation device, and convert the RF excitation signal to DC electric power. The DC electric power is supplied to the signal processing circuit 42 and the wireless communication circuit 43 to effect operation thereof, in one embodiment.

The electric power circuit 45 may include an energy harvesting system that includes a piezoelectric device that captures and converts mechanical motion to electric power, which is supplied to the signal processing circuit 42 and the wireless communication circuit 43 to effect operation thereof, in one embodiment. Piezoelectrical material is known to generate a charge imbalance on the faces thereof when it is subjected to a force and/or is deformed, and the charge imbalance may be captured and transformed to electrical energy.

The electric power circuit 45 may include an electrochemical battery that supplies electric power to the signal processing circuit 42 and the wireless communication circuit 43 to effect operation thereof, in one embodiment. The electric power circuit 45 may include a solar panel that is arranged to capture light and transform it to electric power that is stored in an electrochemical battery or a supercapacitor. The battery or the supercapacitor supply electric power to the signal processing circuit 42 and the wireless communication circuit 43 to effect operation thereof, in one embodiment.

This arrangement provides a fastener 10 with an embedded monitoring system that is capable of wireless monitoring of clamping force being exerted by the fastener 10, and an assembly process associated therewith.

Figure 4:
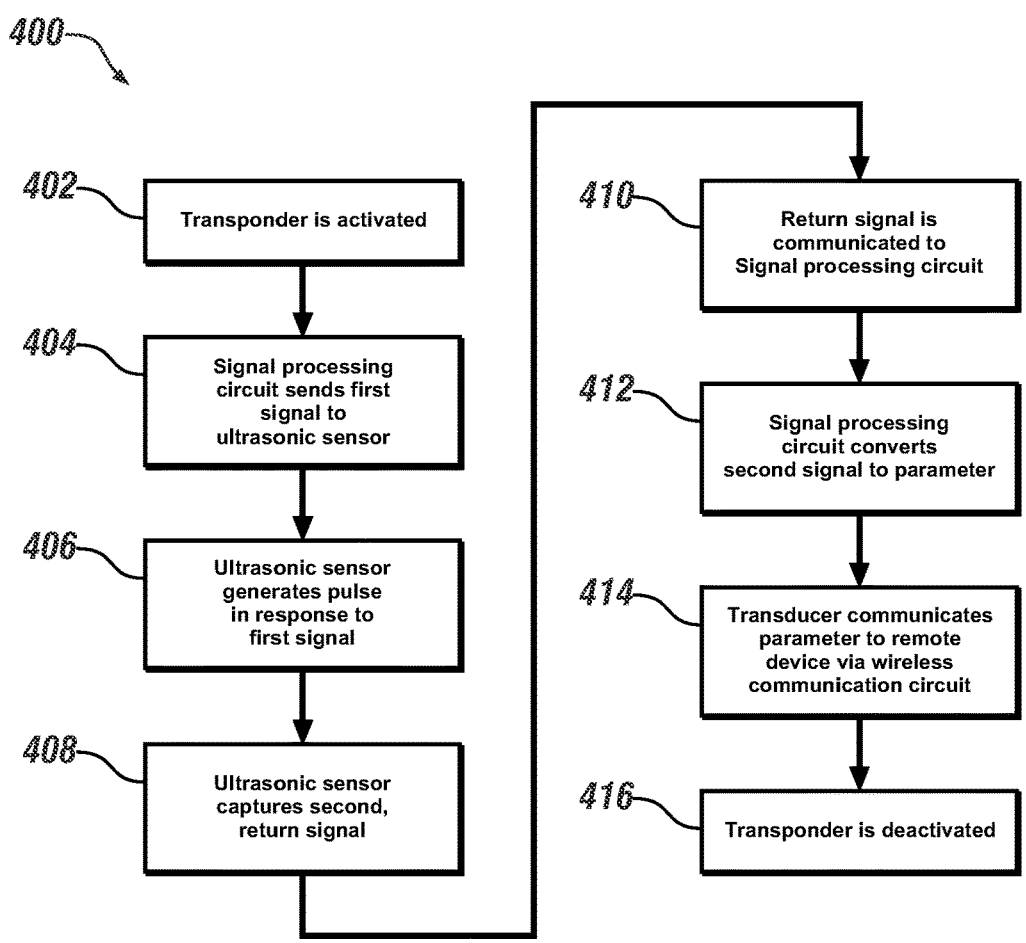
FIG. 4 schematically illustrates a flowchart for interrogating a transponder, in accordance with the disclosure.

FIG. 4 schematically shows a process 400 for operating an embodiment of the system 100 described with reference to FIG. 1 to interrogate, via the interrogator 50, an embodiment of the transponder 40 to determine the physical parameter 52 of the fastener 10, wherein the physical parameter 52 corresponds to a tensile force being exerted by the fastener 10 on junction 14, such as a longitudinal length of the fastener 10.

To perform an interrogation, the transponder 40 is activated (Step 402). In one embodiment, the transponder 40 may be activated in response to an input signal that is communicated from the interrogator 50, wherein the input signal may be a wireless RF excitation signal that empowers the electric power circuit 45, thus activating the transponder 40. Alternatively, the signal processing circuit 42 may include an internal clock, and the input signal may be periodically generated by the internal clock to activate the transponder 40. Upon activation of the transponder 40, the signal processing circuit 42 activates the ultrasonic sensor 41 by sending a first signal to the ultrasonic sensor 41 (Step 404), and the ultrasonic sensor 41 generates a first ultrasonic pulse in response to the first signal (Step 406). The ultrasonic sensor 41 subsequently captures a second, return ultrasonic pulse, along with an elapsed time (Step 408). The second, return ultrasonic pulse and elapsed time are communicated to the signal processing circuit (Step 410), which converts them to the physical parameter 52 that corresponds to longitudinal length 35 of the fastener 10 (Step 412). The transponder 40 communicates the physical parameter 52 to the interrogator 50 via the wireless communication circuit 43 (Step 414), and the transponder 40 is deactivated (Step 416). In this manner, the system 100 is able to interrogate, via the interrogator 50, an embodiment of the transponder 40 to determine the physical parameter 52 of the fastener 10, and communicate the physical parameter 52 to the interrogator 50 via the wireless communication circuit 43, and also communicate the physical parameter 52 from the interrogator 50 to the remote server 54 via the long-range cellular communication system.

FIGS. 5A-5D schematically illustrate embodiments of the transponder 40 including the compression spring 48, the signal processing circuit 42, and the ultrasonic sensor 41. In each of the embodiments, the compression spring 48 is a single, unitary piece that is fabricated from ferritic steel, copper, bronze, titanium, aluminum, and/or alloys thereof including, e.g., phosphor bronze or nickel-plated titanium. In one embodiment, the compression spring 48 is initially a flat, planar workpiece having a uniform width, uniform length and a uniform thickness, and is formed into the final configuration of the compression spring employing cold forming techniques. The illustrated compression springs are non-limiting examples; other embodiments are considered within the scope of the subject matter described and claimed herein.

Figure 5A:
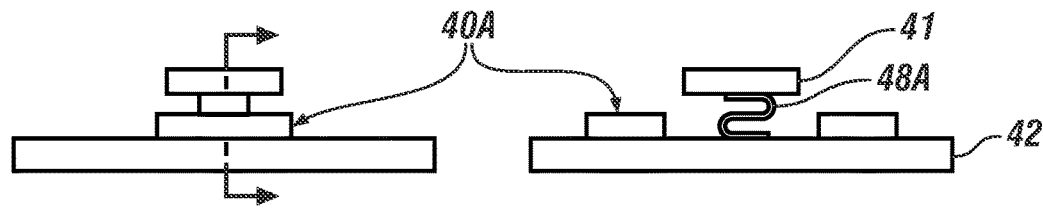
FIGS. 5A through 5D schematically illustrate embodiments of cutaway side views of a fastener and a transponder, in accordance with the disclosure.

FIG. 5A schematically illustrates an end view and corresponding cutaway section view of an embodiment of the transponder 40A including the compression spring 48A, which is interposed between the signal processing circuit 42 and the ultrasonic sensor 41. In this embodiment the compression spring 48A is configured as a S-shaped spring that is interposed between the signal processing circuit 42 and the ultrasonic sensor 41.

Figure 5B:
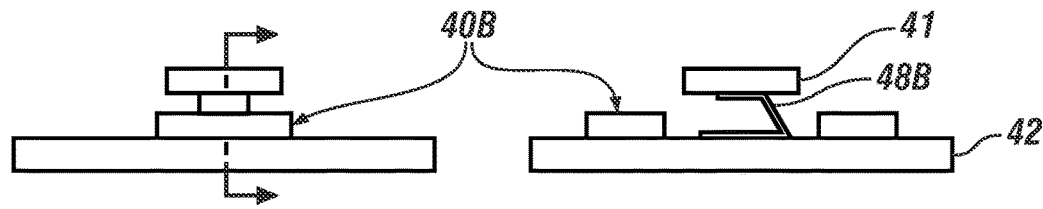

FIG. 5B schematically illustrates an end view and corresponding cutaway section view of another embodiment of the transponder 40B including the compression spring 48B, which is interposed between the signal processing circuit 42 and the ultrasonic sensor 41. In this embodiment the compression spring 48B is configured as a tilting spring that is interposed between the signal processing circuit 42 and the ultrasonic sensor 41.

Figure 5C:
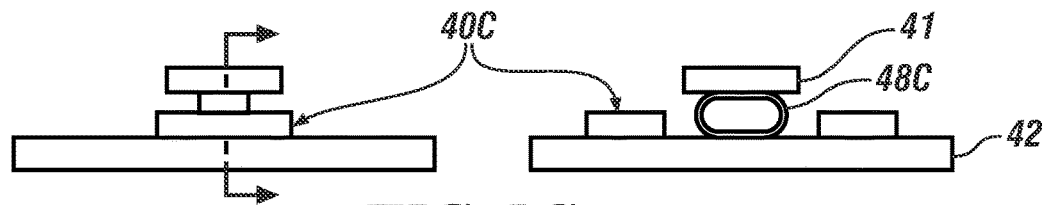

FIG. 5C schematically illustrates an end view and corresponding cutaway section view of another embodiment of the transponder 40C including the compression spring 48C, which is interposed between the signal processing circuit 42 and the ultrasonic sensor 41. In this embodiment the compression spring 48C is configured as an elliptic leaf spring that is interposed between the signal processing circuit 42 and the ultrasonic sensor 41.

Figure 5D:
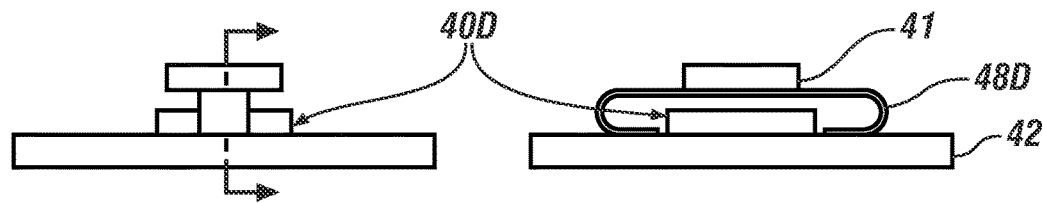

FIG. 5D schematically illustrates an end view and corresponding cutaway section view of another embodiment of the transponder 40D including the compression spring 48D, which is interposed between the signal processing circuit 42 and the ultrasonic sensor 41. In this embodiment the compression spring 48D is configured as a leaf spring that is interposed between the signal processing circuit 42 and the ultrasonic sensor 41.

These arrangements of the transponder 40, including one of the compression springs 48A, 48B, 48C, 48D, the signal processing circuit 42, and the ultrasonic sensor 41 serve to limit radial movements of the signal processing circuit 42 and the ultrasonic sensor 41, and also provide that uniform force is exerted by the compression spring along engaged portions thereof against the signal processing circuit 42 and the ultrasonic sensor 41.

Figure 6:
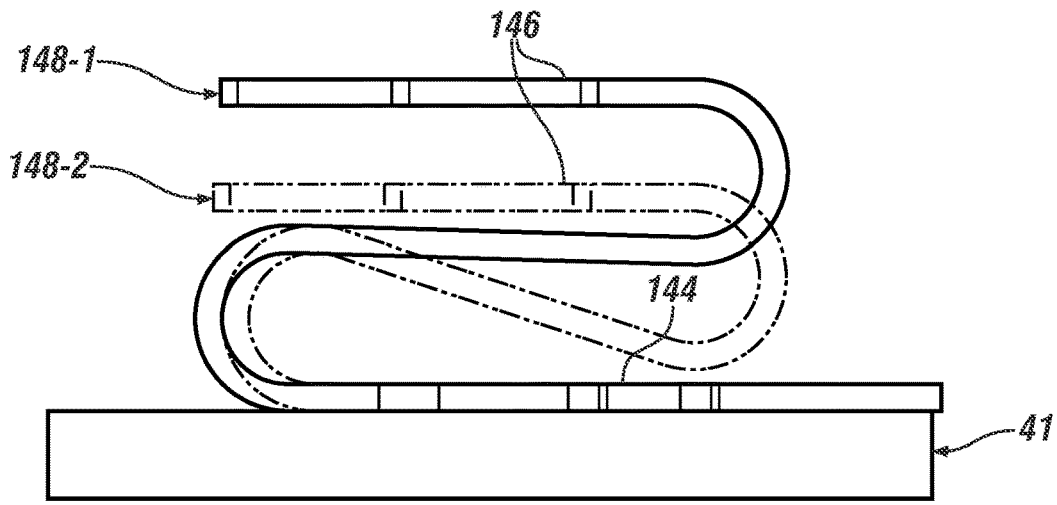
FIG. 6 schematically illustrates a cutaway side view of a fastener and a transponder, in accordance with the disclosure.

FIG. 6 schematically illustrates a cutaway section view of an embodiment of compression spring 148, which is interposed between the signal processing circuit (not shown) and the ultrasonic sensor 41. In this embodiment, the compression spring 148 is configured as a S-shaped spring. Spring 148-1 depicts the spring 148 in a relaxed, unassembled, uncompressed state, with a first end portion 144 and a second end portion 146, wherein the first end portion 144 is in parallel with the second end portion 146. In one embodiment, the first end portion 144 is joined to the second end portion 146 via an elastic portion. The first end portion 144 and the second end portion 146 form the engaged portions of the compression spring 148. The first end portion 144 of the compression spring 148 is fixedly secured to the ultrasonic sensor 41 in one embodiment. The second end portion 146 of the compression spring 148 is urged against the signal processing circuit (not shown) when assembled.

Spring 148-2 depicts the spring 148 in an assembled, compressed state, such as may occur when the ultrasonic sensor 41 is assembled into a head portion of a fastener, as shown and described with reference to FIG. 1. As illustrated, the second end portion 146 of the compression spring 148 remains in parallel with the first end portion 144 in the compressed state, which enables the compression spring 148 to provide a uniform static force on the ultrasonic sensor 41.

Figure 7:
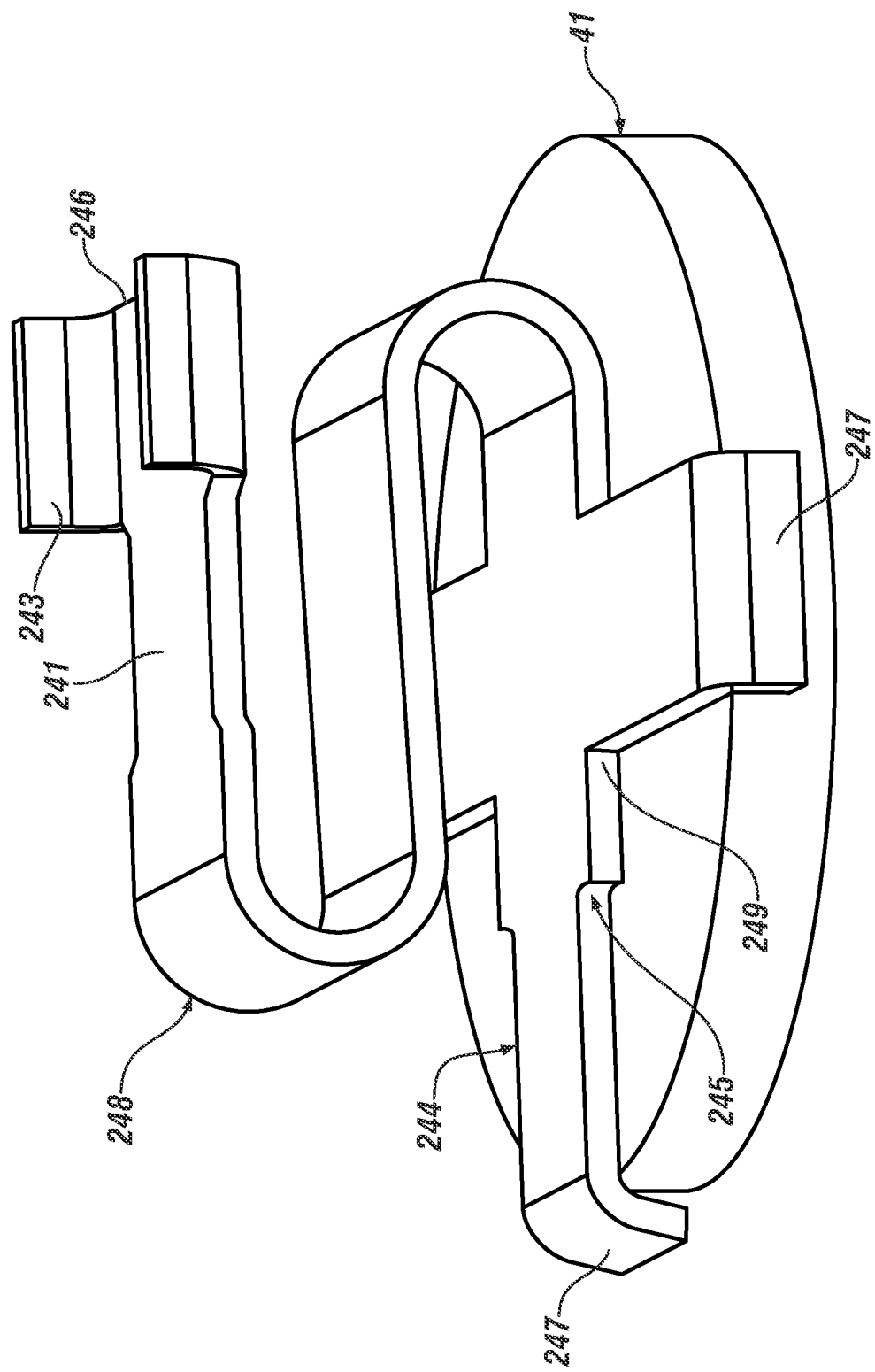
FIG. 7 schematically illustrates an isometric view of elements of a fastener and a transponder, in accordance with the disclosure.

FIG. 7 schematically illustrates another embodiment of the compression spring 248 and ultrasonic sensor 41. In this embodiment, the compression spring 248 is configured as a S-shaped spring with features for mounting and securing the ultrasonic sensor 41 arranged on a first end portion 244 and with features for coupling to the signal processing circuit 42 (not shown) arranged on a second end portion 246.

The features for coupling the second end portion 246 of the compression spring 248 to the signal processing circuit 42 (not shown) include, in one embodiment, a soldering pad 241 including a clip 243. The features for coupling the first end portion 244 of the compression spring 248 to the ultrasonic sensor 41 include a sensor mounting bracket 245 composed of a plurality of upturned tabs 247 and a sensor bearing surface 249. The compression spring 248 as shown is depicted in a relaxed, unassembled, uncompressed state, with the first end portion 244 being in parallel with the second end portion 246. The first end portion 244 and the second end portion 246 form the engaged portions of the compression spring 248. The first end portion 244 of the compression spring 248 is fixedly secured to the ultrasonic sensor 41 via the sensor mounting bracket 245.

The concepts described herein also provide a method for fabricating a fastener 10 with the wireless transponder 40. This includes forming the fastener body including the head portion 20 and the shank portion 30, wherein the head portion 20 includes the void space 22 that is countersunk into the head portion 20. The ultrasonic sensor 41 is assembled onto the first end 31 of the shank portion 30 in one embodiment. The PCB 47 of the wireless transponder 40 is fabricated with the signal processing circuit 42, the wireless communication circuit 43, the electric power circuit 45 and the grounding ring 49 assembled thereon. The compression spring 48 is assembled onto the PCB 47 and in communication with the signal processing circuit 42. The PCB 47 is assembled onto the head portion 20 of the fastener body, with the compression spring 48 being in contact with the ultrasonic sensor 41, and the grounding ring 49 of the PCB 47 being in electrical contact with the head portion 20. Alternatively, the ultrasonic sensor 41 may be assembled on the compression spring 48 during fabrication of the PCB 47, and the assembly that includes the PCB 47 and the ultrasonic sensor 41 are assembled on the head portion 20 of the fastener body at the same time.

The signal processing circuit 42, wireless communication circuit 43, electric power circuit 45 and the grounding ring 49 are disposed in the void space 22 of the head portion 20, with curable bonding material 25 being applied onto an outer periphery of the PCB 47 and the mounting portion 21 the head portion 20, thus securing the electronic portions of the PCB 47 to the head portion 20 and hermetically sealing the electronic portions of the PCB 47 into the head portion 20. The ultrasonic sensor 41 communicates with the signal processing circuit 42 via the compression spring 48.

The term "system" may refer to one of or a combination of mechanical and electrical actuators, sensors, controllers, application-specific integrated circuits (ASIC), combinatorial logic circuits, software, firmware, and/or other components that are arranged to provide the described functionality. Furthermore, the embodiments may be described herein in terms of functional and/or logical block components and various processing steps. Such block components may be realized by any number, combination or collection of mechanical and electrical hardware, software, and/or firmware components configured to perform the specified functions. For example, an embodiment may employ various combinations of mechanical components and electrical components, integrated circuit components, memory elements, digital signal processing elements, logic elements, look-up tables, or the like, which may carry out a variety of functions under the control of one or more microprocessors or other control devices. In addition, those skilled in the art will appreciate that the exemplary embodiments may be practiced in conjunction with any number of mechanical and/or electronic systems, and that the systems described herein are merely exemplary embodiment of possible implementations.

The term "controller" and related terms such as microcontroller, control, control unit, processor, etc. refer to one or various combinations of Application Specific Integrated Circuit(s) (ASIC), Field-Programmable Gate Array(s) (FPGA), electronic circuit(s), central processing unit(s), e.g., microprocessor(s) and associated non-transitory memory component(s) in the form of memory and storage devices (read only, programmable read only, random access, hard drive, etc.). The non-transitory memory component is capable of storing machine readable instructions in the form of one or more software or firmware programs or routines, combinational logic circuit(s), input/output circuit(s) and devices, signal conditioning, buffer circuitry and other components, which can be accessed by and executed by one or more processors to provide a described functionality. Input/output circuit(s) and devices include analog/digital converters and related devices that monitor input signals from sensors, with such input signals monitored at a preset sampling frequency or in response to a triggering event. Software, firmware, programs, instructions, control routines, code, algorithms, and similar terms mean controller-executable instruction sets including calibrations and look-up tables. Each controller executes control routine(s) to provide desired functions. Routines may be executed at regular intervals, for example every 100 microseconds during ongoing operation. Alternatively, routines may be executed in response to occurrence of a triggering event. Communication between controllers, actuators and/or sensors may be accomplished using a direct wired point-to-point link, a networked communication bus link, a wireless link, or another communication link. Communication includes exchanging data signals, including, for example, electrical signals via a conductive medium; electromagnetic signals via air; optical signals via optical waveguides; etc. The data signals may include discrete, analog and/or digitized analog signals representing input signals from sensors, actuator commands, and communication between controllers.

The term "signal" refers to a physically discernible indicator that conveys information, and may be a suitable waveform (e.g., electrical, optical, magnetic, mechanical or electromagnetic), such as DC, AC, sinusoidal-wave, triangular-wave, square-wave, vibration, and the like, that is capable of traveling through a medium.

The terms 'dynamic' and 'dynamically' describe steps or processes that are executed in real-time and are characterized by monitoring or otherwise determining states of parameters and regularly or periodically updating the states of the parameters during execution of a routine or between iterations of execution of the routine.

The terms "calibration", "calibrated", and related terms refer to a result or a process that correlates a desired parameter and one or multiple perceived or observed parameters for a device or a system. A calibration as described herein may be reduced to a storable parametric table, a plurality of executable equations or another suitable form that may be employed as part of a measurement or control routine.

A parameter is defined as a measurable quantity that represents a physical property of a device or other element that is discernible using one or more sensors and/or a physical model. A parameter can have a discrete value, e.g., either "1" or "0", or can be infinitely variable in value.

The following Clauses provide example configurations of a fastener and associated monitoring system as disclosed herein.

Clause 1: A fastener, comprising a head portion, a shank portion, a transponder, and a compression spring; wherein the head portion includes a mounting portion; wherein the transponder is disposed in the mounting portion of the head portion; wherein the transponder is arranged to monitor the shank portion; wherein the transponder includes an ultrasonic sensor and a signal processing circuit; wherein the signal processing circuit is arranged on a printed circuit board; wherein the ultrasonic sensor is affixed to a transducer hosting surface arranged on a first end of the shank portion; wherein the ultrasonic sensor is urged against the transducer hosting surface by placement of the printed circuit board in the head portion with the compression spring intervening therebetween; wherein the ultrasonic sensor communicates with the signal processing circuit via the compression spring; wherein the signal processing circuit activates the ultrasonic sensor; and wherein the signal processing circuit captures a signal from the ultrasonic sensor and transforms the signal into a parameter corresponding to a tensile force being exerted by the fastener.

Clause 2. The fastener of Clause 1, further comprising: the printed circuit board including a grounding ring arranged on an outer periphery thereof; wherein the grounding ring is in electrical contact with the head portion of the fastener.

Clause 3. The fastener of any of Clauses 1 through 2, further comprising a wireless communication circuit, and an electric power circuit; wherein the signal processing circuit, the wireless communication circuit, and the electric power circuit are arranged on a printed circuit board; and wherein the electric power circuit supplies electric power to the signal processing circuit and the wireless communication circuit.

Clause 4. The fastener of any of Clauses 1 through 3, wherein the electric power circuit supplies electric power to the signal processing circuit and the wireless communication circuit.

Clause 5. The fastener of any of Clauses 1 through 4, wherein the electric power circuit is arranged to supply the electric power to the signal processing circuit and the wireless communication circuit in response to an input signal.

Clause 6. The fastener of any of Clauses 1 through 5, wherein the grounding ring is arranged to electrically ground the printed circuit board to the head portion of the fastener.

Clause 7. The fastener of any of Clauses 1 through 6, wherein the wireless communication circuit generates a message based upon the parameter corresponding to the tensile force.

Clause 8. The fastener of any of Clauses 1 through 7, wherein the parameter corresponding to the tensile force being exerted by the fastener comprises a longitudinal length of the shank portion.

Clause 9. The fastener of any of Clauses 1 through 8, wherein the compression spring comprises an elliptic leaf spring that is interposed between the signal processing circuit and the ultrasonic sensor.

Clause 10. The fastener of any of Clauses 1 through 9, wherein the compression spring comprises an S-shaped spring that is interposed between the signal processing circuit and the ultrasonic sensor.

Clause 11. The fastener of any of Clauses 1 through 10, wherein the compression spring comprises a tilting spring that is interposed between the signal processing circuit and the ultrasonic sensor.

Clause 12. The fastener of any of Clauses 1 through 11, wherein the compression spring comprises a first end portion joined to a second end portion via an elastic portion, wherein the first end portion is in contact with the ultrasonic sensor and wherein the second end portion is in contact with the signal processing circuit.

Clause 13. The fastener of any of Clauses 1 through 12, wherein the ultrasonic sensor comprises a piezoelectric crystal device having a first electrode and a second electrode; wherein the first electrode of the piezoelectric crystal device is affixed to the transducer hosting surface arranged on the first end of the shank portion; and wherein the second electrode of the piezoelectric crystal device is affixed to the compression spring.

Clause 14. The fastener of any of Clauses 1 through 13, wherein the first electrode is composed of silver or a silver alloy, and wherein the second electrode is composed of copper or a copper alloy.

Clause 15. A system for monitoring first and second components at a junction, the system comprising: a fastener including a shank portion; a transponder; a compression spring; a grounding ring; and a remotely-disposed interrogator; wherein the transponder is arranged to monitor the shank portion; wherein the transponder includes an ultrasonic sensor, a signal processing circuit, a wireless communication circuit, and an electric power circuit; wherein the signal processing circuit, the wireless communication circuit, and the electric power circuit are arranged on a printed circuit board; wherein the ultrasonic sensor is arranged on a first end of the shank portion; wherein the ultrasonic sensor is in communication with the signal processing circuit via the compression spring; wherein the signal processing circuit captures a signal from the ultrasonic sensor and transforms the signal into a parameter corresponding to tensile force being exerted by the fastener at the junction of the first and second components; wherein the wireless communication circuit generates a message based upon the parameter associated with the tensile force being exerted by the fastener at the junction of the first and second components; and wherein the remotely-disposed interrogator is arranged to wirelessly communicate with the wireless communication circuit of the fastener to receive the message based upon the parameter associated with the tensile force being exerted by the fastener at the junction of the first and second components.

Clause 16. The system of Clause 15, further comprising: the fastener including a head portion; wherein the head portion includes a mounting portion; and wherein the transponder is disposed in the mounting portion of the head portion.

Clause 17. The system of any of Clauses 15 through 16, wherein the ultrasonic sensor is urged against the first end of the shank portion by placement of the printed circuit board in the head portion with the compression spring intervening therebetween.

Clause 18. The system of any of Clauses 15 through 17, further comprising the grounding ring being arranged to electrically ground the printed circuit board to the head portion.

Clause 19. The system of any of Clauses 15 through 18, further comprising the electric power circuit being arranged to generate electric power in response to an input signal.

Clause 20. The system of any of Clauses 15 through 19, further comprising the signal processing circuit being arranged to activate the ultrasonic sensor and activate the electric power circuit in response to an input signal.

Clause 21. The system of any of Clauses 15 through 20, wherein the remotely-disposed interrogator is arranged to generate the input signal.

Clause 22. A method for fabricating a fastener having a wireless transponder, the method comprising: forming a fastener body including a head portion and a shank portion, wherein the head portion includes a void space that is countersunk into the head portion; assembling an ultrasonic sensor onto a first end of the shank portion; fabricating a printed circuit board having a signal processing circuit, a wireless communication circuit, an electric power circuit and a grounding ring assembled thereon; assembling a conductive compression spring onto the signal processing circuit; assembling the printed circuit board onto the head portion, including the conductive compression spring being in contact with the ultrasonic sensor, and the grounding ring of the printed circuit board being in electrical contact with the head portion; and applying a curable bonding material onto an outer periphery of the printed circuit board and the head portion; wherein the signal processing circuit, wireless communication circuit, electric power circuit and grounding ring are disposed in the void space of the head portion; and wherein the ultrasonic sensor communicates with the signal processing circuit via the conductive compression spring.

The detailed description and the drawings or figures are supportive and descriptive of the present teachings, but the scope of the present teachings is defined solely by the claims. While some of the best modes and other embodiments for carrying out the present teachings have been described in detail, various alternative designs and embodiments exist for practicing the present teachings defined in the claims.

What is claimed is:

1. A fastener, comprising:
   a head portion, a shank portion, a transponder, and a compression spring;
   wherein the head portion includes a mounting portion;
   wherein the transponder is disposed in the mounting portion of the head portion;
   wherein the transponder is arranged to monitor the shank portion;
   wherein the transponder includes an ultrasonic sensor and a signal processing circuit;
   wherein the signal processing circuit is arranged on a printed circuit board;
   wherein the ultrasonic sensor is affixed to a transducer hosting surface arranged on a first end of the shank portion;
   wherein the ultrasonic sensor is urged against the transducer hosting surface by placement of the printed circuit board in the head portion with the compression spring intervening therebetween;
   wherein the ultrasonic sensor communicates with the signal processing circuit via the compression spring;
   wherein the signal processing circuit activates the ultrasonic sensor;
   wherein the signal processing circuit captures a signal from the ultrasonic sensor and transforms the signal into a parameter corresponding to a tensile force being exerted by the fastener.

2. The fastener of claim 1, further comprising:
   the printed circuit board including a grounding ring arranged on an outer periphery thereof;
   wherein the grounding ring is in electrical contact with the head portion of the fastener.

3. The fastener of claim 2, wherein the grounding ring is arranged to electrically ground the printed circuit board to the head portion of the fastener.

4. The fastener of claim 1, further comprising a wireless communication circuit, and an electric power circuit;
   wherein the signal processing circuit, the wireless communication circuit, and the electric power circuit are arranged on the printed circuit board; and
   wherein the electric power circuit supplies electric power to the signal processing circuit and the wireless communication circuit.

5. The fastener of claim 4, wherein the electric power circuit supplies electric power to the signal processing circuit and the wireless communication circuit.

6. The fastener of claim 4, wherein the electric power circuit is arranged to supply the electric power to the signal processing circuit and the wireless communication circuit in response to an input signal.

7. The fastener of claim 4, wherein the wireless communication circuit generates a message based upon the parameter corresponding to the tensile force.

8. The fastener of claim 1, wherein the parameter corresponding to the tensile force being exerted by the fastener comprises a longitudinal length of the shank portion.

9. The fastener of claim 1, wherein the compression spring comprises an elliptic leaf spring that is interposed between the signal processing circuit and the ultrasonic sensor.

10. The fastener of claim 1, wherein the compression spring comprises an S-shaped spring that is interposed between the signal processing circuit and the ultrasonic sensor.

11. The fastener of claim 1, wherein the compression spring comprises a tilting spring that is interposed between the signal processing circuit and the ultrasonic sensor.

12. The fastener of claim 1, wherein the compression spring comprises a first end portion joined to a second end portion via an elastic portion, wherein the first end portion is in contact with the ultrasonic sensor and wherein the second end portion is in contact with the signal processing circuit.

13. The fastener of claim 1, wherein the ultrasonic sensor comprises a piezoelectric crystal device having a first electrode and a second electrode;
  wherein the first electrode of the piezoelectric crystal device is affixed to the transducer hosting surface arranged on the first end of the shank portion; and
  wherein the second electrode of the piezoelectric crystal device is affixed to the compression spring.

14. The fastener of claim 13, wherein the first electrode is composed of silver or a silver alloy, and wherein the second electrode is composed of copper or a copper alloy.

15. A system for monitoring first and second components at a junction, the system comprising:
  a fastener including a shank portion; a transponder; a compression spring; a grounding ring; and a remotely-disposed interrogator;
  wherein the transponder is arranged to monitor the shank portion;
  wherein the transponder includes an ultrasonic sensor, a signal processing circuit, a wireless communication circuit, and an electric power circuit;
  wherein the signal processing circuit, the wireless communication circuit, and the electric power circuit are arranged on a printed circuit board;
  wherein the ultrasonic sensor is arranged on a first end of the shank portion;
  wherein the ultrasonic sensor is in communication with the signal processing circuit via the compression spring;
  wherein the signal processing circuit captures a signal from the ultrasonic sensor and transforms the signal into a parameter corresponding to a tensile force being exerted by the fastener at the junction of the first and second components;
  wherein the wireless communication circuit generates a message based upon the parameter associated with the tensile force being exerted by the fastener at the junction of the first and second components; and
  wherein the remotely-disposed interrogator is arranged to wirelessly communicate with the wireless communication circuit of the fastener to receive the message based upon the parameter associated with the tensile force being exerted by the fastener at the junction of the first and second components.

16. The system of claim 15, further comprising:
  the fastener further including a head portion;
  wherein the head portion includes a mounting portion; and
  wherein the transponder is disposed in the mounting portion of the head portion.

17. The system of claim 16, wherein the ultrasonic sensor is urged against the first end of the shank portion by placement of the printed circuit board in the head portion with the compression spring intervening therebetween.

18. The system of claim 15, further comprising the electric power circuit being arranged to generate electric power in response to an input signal.

19. The system of claim 18, further comprising the signal processing circuit being arranged to activate the ultrasonic sensor and activate the electric power circuit in response to the input signal, and wherein the remotely-disposed interrogator is arranged to generate the input signal.

20. A method for fabricating a fastener having a wireless transponder, the method comprising:
  forming a fastener body including a head portion and a shank portion, wherein the head portion includes a void space that is countersunk into the head portion;
  assembling an ultrasonic sensor onto a first end of the shank portion;
  fabricating a printed circuit board having a signal processing circuit, a wireless communication circuit, an electric power circuit and a grounding ring assembled thereon;
  assembling a conductive compression spring onto the signal processing circuit;
  assembling the printed circuit board onto the head portion, including the conductive compression spring being in contact with the ultrasonic sensor, and the grounding ring of the printed circuit board being in electrical contact with the head portion; and
  applying a curable bonding material onto an outer periphery of the printed circuit board and the head portion;
  wherein the signal processing circuit, wireless communication circuit, electric power circuit and grounding ring are disposed in the void space of the head portion; and
  wherein the ultrasonic sensor communicates with the signal processing circuit via the conductive compression spring.

* * * * *